(No Model.)

A. NATHAN.
ELECTRICAL ALARM FOR CARS.

No. 587,534. Patented Aug. 3, 1897.

WITNESSES:
C. Vordfors
C. Gersh

INVENTOR
Alexander Nathan
BY
Edgar Tate & Co
ATTORNEYS.

THE NORRIS PETERS CO., PHOTO-LITHO., WASHINGTON, D. C.

UNITED STATES PATENT OFFICE.

ALEXANDER NATHAN, OF NEW YORK, N. Y.

ELECTRICAL ALARM FOR CARS.

SPECIFICATION forming part of Letters Patent No. 587,534, dated August 3, 1897.

Application filed June 8, 1897. Serial No. 639,830. (No model.)

*To all whom it may concern:*

Be it known that I, ALEXANDER NATHAN, a citizen of the United States, residing at New York, in the county of New York and State of New York, have invented certain new and useful Improvements in Electrical Alarms for Cars, of which the following is a full and complete specification, such as will enable those skilled in the art to which it appertains to make and use the same.

This invention relates to electric alarms for trolley and other tramway cars; and the object thereof is to provide an improved device of this class which is simple in construction and operation and which is perfectly adapted to accomplish the result for which it is intended, while being also comparatively inexpensive.

In the following specification I have shown and described my improvement as applied to an electric or trolley car; and the invention is fully disclosed in the following specification, of which the accompanying drawings form a part, in which—

Figure 1:
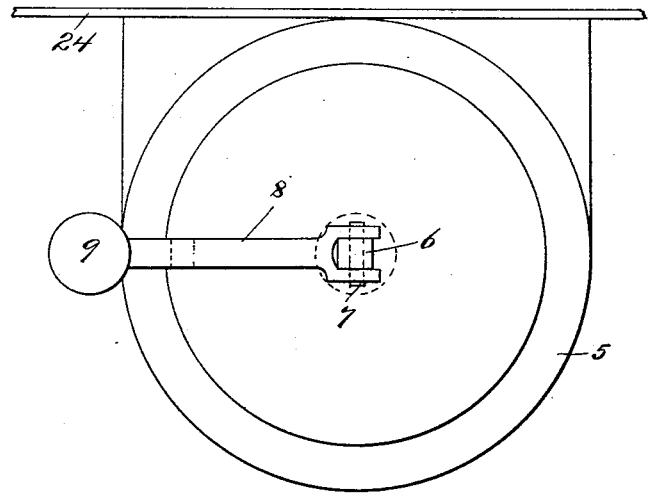
Figure 2:
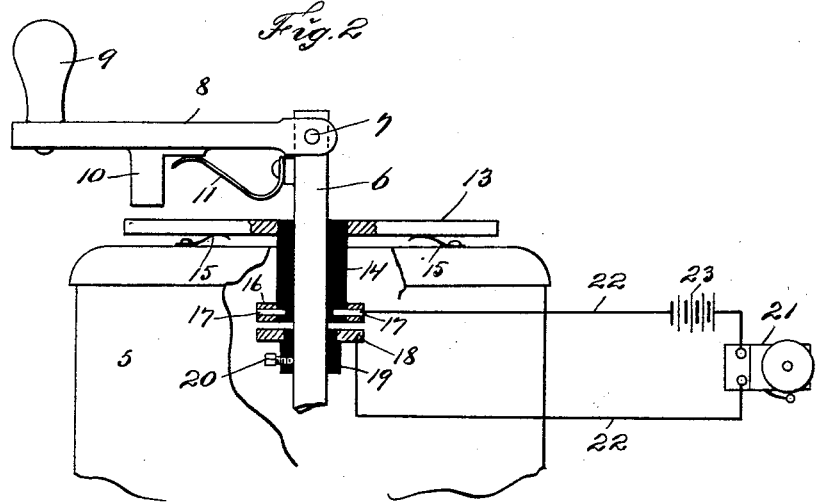

Figure 1 is a plan view of the apparatus which I employ, and Fig. 2 a sectional side view thereof.

In the drawings forming part of this specification the separate parts of my improvement are designated by the same numerals of reference in each of the views, and in said drawings I have shown at 5 the tubular or cylindrical casing, in which the mechanism for turning on and off the current which operates the car or for stopping and starting the motor is mounted, and I have also shown in Fig. 2 the vertical shaft 6, by which said mechanism is operated, said mechanism being not shown; and in the practice of my invention I pivotally connect with the upper end of said shaft, as shown at 7, a lever 8, which is provided at its outer end with a handle 9 and on the lower side thereof with a downwardly-directed arm 10, and secured to the shaft 6 is a spring 11, which bears on the lower side of said lever and is adapted to hold it in a horizontal position. I have also shown at 13 a disk or plate which is mounted on the shaft 6 and which is insulated therefrom by a tubular insulation 14, and the disk or plate 13 is supported above the top of the tubular or cylindrical casing 5 by springs 15, which are shown as secured to the top of said cylindrical or tubular casing, but which may be secured to the under side of said disk or plate.

The disk or plate 13 and the tubular insulating-sleeve 14 thereof are free to move up and down on the shaft 6, and connected with the lower end of the said tubular insulation 14 is a disk or plate 16, which is secured thereto by screws, pins, or bolts 17 or in any desired manner, and said disk or plate 16 is also free to move vertically with the disk or plate 13 and the tubular insulation 14.

Mounted on the shaft 6, adjacent to the disk or plate 16, is a similar disk or plate 18, which is also insulated from said shaft by an insulating-sleeve 19, and said disk or plate 18 is rigidly connected with said shaft by a screw 20, which passes through the sleeve 19.

In the normal position of the parts above described the disk or plate 16 and the disk or plate 18 are but slightly separated, and by depressing the outer end of the lever 8 the arm 10 will be brought in contact with the disk or plate 13 and the latter will be forced downwardly and carry with it the disk or plate 16, and said disk or plate 16 will be forced into connection with the disk or plate 18, and it will be understood that the lever 8 is also used for manipulating the shaft 6 for the purpose of operating the motor, as hereinbefore described, this operation being accomplished by simply turning said lever and said shaft 6.

I have also shown at 21 an electric alarm-bell, which is adapted to be connected with the car at any desired point, preferably beneath the platform, and extending from this alarm-bell and connecting with the disks or plates 17 and 18 are wires or conductors 22, and in the circuit thus formed is placed a battery 23, and said battery may be located at any desired point, or in place thereof I may use the current which operates the car, in which event said battery will not be required.

The operation will be readily understood from the foregoing description when taken in connection with the accompanying drawings and the following statement thereof.

The disks or plates 13 and 16 are normally held in the position shown in Fig. 2 by means of the springs 15, and whenever it is desired to operate the alarm-bell the outer end of the lever 9 is depressed against the operation of the spring 11 and the arm 10 is forced into connection with the disk or plate 17, and said disk or plate, together with the insulating-sleeve 14 and the disk or plate 16, is forced downwardly until the alarm strikes the disk or plate 18, and this operation closes the circuit and operates the alarm, and when pressure on the lever 8 is removed the disk or plate 18 will at once be thrown upwardly into the position shown in Fig. 2 and the circuit in which the alarm is placed will be closed.

This device is simple in construction and operation and is perfectly adapted to accomplish the result for which it is intended, and it will be understood that the tubular casing or cylinder 5 is connected with the dashboard of the car, a part of which is shown at 24, in the usual manner, and it will be apparent that changes in and modifications of the construction herein described may be made without departing from the spirit of my invention or sacrificing its advantages.

Having fully described my invention, I claim as new and desire to secure by Letters Patent—

1. The herein-described electric alarm for cars, said alarm consisting of a vertical shaft, a spring-supported lever pivotally connected with the upper end thereof, and provided with a downwardly-directed arm, a vertically-movable disk or plate mounted on said shaft below said lever, a disk or plate mounted below said vertically-movable disk or plate, and connected and vertically movable therewith, a disk or plate rigidly secured to said shaft below said last-named disk or plate, and an alarm-bell in electrical connection with said last-named disks or plates, substantially as shown and described.

2. An electric alarm for electric cars, consisting of a lever pivotally connected with the upper end of the shaft by which the motor of the car is operated, said lever being spring-supported, and provided with a downwardly-directed arm, a spring-supported plate mounted on said shaft below said lever and insulated from said shaft by a sleeve, a disk or plate connected with said sleeve and vertically movable therewith, and with said spring-supported disk or plate, a disk or plate mounted on said shaft, and secured thereto, and insulated therefrom below said last-named disk or plate, and an electric bell in circuit with said last-named disks or plates, substantially as shown and described.

3. An electric alarm for cars, consisting of a vertical shaft, a spring-supported disk or plate mounted thereon, and insulated therefrom by means of a sleeve, a disk or plate connected with the lower end of said sleeve, another disk or plate mounted on said shaft below said last-named disk or plate and insulated from said shaft, and an electric bell in circuit with said last-named disks or plates, substantially as shown and described.

In testimony that I claim the foregoing as my invention I have signed my name, in presence of the subscribing witnesses, this 5th day of June, 1897.

ALEXANDER NATHAN.

Witnesses:
C. GERST,
A. C. VAN BLARCOM.